United States Patent
Carson et al.

(10) Patent No.: US 7,881,904 B1
(45) Date of Patent: Feb. 1, 2011

(54) METHOD FOR ASSESSING AND FORECASTING THE OPERATIONAL HEALTH OF A TELEPHONE NETWORK SWITCH

(75) Inventors: Robert W. Carson, Cypress, TX (US); Brian Huntley, Bellingham, MA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 753 days.

(21) Appl. No.: 11/633,757

(22) Filed: Dec. 5, 2006

(51) Int. Cl.
*G06F 15/00* (2006.01)

(52) U.S. Cl. .................................... 702/179

(58) Field of Classification Search ............... 702/179, 702/181–184
See application file for complete search history.

(56) References Cited

U.S. PATENT DOCUMENTS

| 6,748,341 | B2 | 6/2004 | Crowder et al. |
| 6,870,900 | B1 * | 3/2005 | Beamon ............ 379/9.03 |

* cited by examiner

*Primary Examiner*—Edward Raymond
(74) *Attorney, Agent, or Firm*—Jeffrey D. Mintzes

(57) ABSTRACT

A current operational health of a Telephone Network Switch (TNS) is determined by selectively using only certain parameters. These selected parameters, both internal and external to the TNS, are those that most influence the operational health. The operational health of the TNS is projected into the future in order to forecast the TNS performance. Not only can a current or future deviation be determined, but also a source of the deviation is identified allowing for a focused preventative maintenance effort.

8 Claims, 2 Drawing Sheets

METHOD FOR ASSESSING AND FORECASTING THE OPERATIONAL HEALTH OF A TELEPHONE NETWORK SWITCH

FIELD OF THE INVENTION

The present invention relates generally to preventive maintenance in telecommunications systems, and more particularly to assessing an operational health of a Telephone Network Switch and forecasting its operational health into the future.

BACKGROUND OF THE INVENTION

Properly assessing a piece of equipment's operational integrity, herein called "operational health", is a problem that is widespread. The danger of not accurately assessing a piece of equipment's operational health, i.e. how the equipment is functioning in contrast with its ideal level of performance, is that the equipment could suddenly fail without any forewarning. In a case where the equipment plays a critical role in the functioning of a large production facility such as an oilrig, or is a critical component in a communications network, such a failure could lead to a loss of millions of dollars in lost equipment and revenues.

Even if an organization took a cautious stance and decided to perform an excessive amount of preventive maintenance, this too has a downside. Such maintenance leads to excessive labor costs, and may actually increase the chance of equipment failure due to the faulty performance of a preventative maintenance procedure.

While there are current technologies for monitoring the operational health of a piece of equipment, these technologies have several weaknesses. One of the weaknesses is that these methods individually evaluate multiple reports and alarms from a piece of equipment, where each of these reports or alarms is associated with a different aspect of the overall operational health of the equipment. When an individual value from the report or alarm falls outside of a particular range, an operator is alerted. This is a piecemeal approach, in which the equipment is viewed as merely a collection of individual parts. However, an accurate prediction of the operational health of the entire equipment may only come to light when these individual reports and alarms are evaluated together. Each feedback value may not reveal a potential equipment failure that is only uncovered when the overall equipment is evaluated.

U.S. Pat. No. 6,748,341, whose disclosure is incorporated herein by reference, generally involves a method and device for providing an overall machine health prediction. This is accomplished by generating a set of predictive equations using either historical or real-time calibration data from one or more normally operating machines rather than from the current piece of equipment under evaluation. One of these equations is selected, and the operational parameters for a piece of equipment under evaluation are entered into the equation. The calculated value representing the operational health of the equipment under evaluation is compared to a value determined from historical or real-time data from other normally operating machines. The difference between the predicted and actual operation health values is determined. If the difference is statistically significant, an overall probably of machine abnormality is determined.

While the '341 patent addresses the problem of determining the current, overall operational health of a piece of equipment, it still leaves several weaknesses. First, the '341 patent only teaches comparing a current operational health of a piece of equipment with historical or real-time values of other similar pieces of equipment. However, it doesn't teach comparing the operational health of a piece of equipment with its own historical performance. Using the equipment's own historical performance data is significant because each piece of equipment has a unique, acceptable operational health range due to equipment specific factors. Some of these factors include: the age of the equipment, the environment in which it is being used, and the volume of usage the equipment experiences. These and other factors could lead to an acceptable operational range that is unique for that piece of equipment, even in comparison to other similar equipment. Second, the '341 patent only discusses determining the current operational health of the equipment without projecting the equipment's performance into the future. However, it is useful to know not only the current operational health of a piece of equipment, but also to project a forecast of the equipment's performance into the future. Third, the '341 patent does not teach determining which element of the piece of equipment is likely to cause a deviation in the operational health. It is useful to know which element of the equipment is contributing to the deviation in proper operational health in order to effectively focus preventative maintenance. Fourth, the '341 patent discusses taking "raw data for machine variables of interest" as the data used in determining the current operational status of the equipment. However, an effective predictive maintenance tool should not only take into account raw data for machine variables of interest, but also take into account external feedback concerning the equipment's performance, such as reported user-complaints, typical capacity-utilization of the equipment, and diligence in performing established preventive maintenance routines.

An example of a piece of equipment, the knowledge of whose operational health is critical for the organization utilizing the equipment is a Telephone Network Switch (TNS). A TNS is a central part to a telecommunications network which facilitates the routing of a call from the calling party to the called party. It is important to detect a potential failure of a TNS before an organization experiences a downed communications network due to a failed TNS.

While it is clearly important to know the operational health of a TNS, such a determination may be economically infeasible. A typical TNS is programmed to issue dozens and possibly even hundreds of reports and alarms concerning its operational health. It is challenging and labor intensive to monitor each of these feedback values on a continuing basis. Additionally, several other variables that are not included in these reports and alarms also play an important role in predicting the health of the TNS. Collecting and analyzing the TNS reports and alarms as well as the other variables not included in these reports and alarms may involve too much labor and capital resources to make such a monitoring economically worthwhile.

SUMMARY OF THE INVENTION

In accordance with one aspect of the current invention, an effective tool for assessing the operational health of a TNS includes several features. In one embodiment, the inventive tool selectively chooses values that are most indicative of the equipment's performance. This tool may also appropriately weight each value according to each value's relative contribution in assessing the operation health of the TNS. In order to get a comprehensive view of the operational health of the TNS, the inventive tool may consist not only of internal equipment diagnostics, but also may include external measurements of the equipment's operational health. This inventive tool may also determine an acceptable operational health window for the TNS based on actual historical data of the TNS being monitored. Using this historical data provides a more accurate prediction of operational health than using data determined from another TNS since it takes into account the unique characteristics and operational environment of a given TNS. Additionally, the inventive tool not only has the capacity to determine the current operational health, but also to make a projection of the operational health and forecast the future TNS performance.

In one aspect of the current invention, a limited number of the available feedback values associated with a TNS are chosen for analysis. For convenience, in one embodiment, these values are classified under different "parameters", the parameters categorizing different aspects of the operational status, or health, of a TNS. These parameters include, in one embodiment, both equipment diagnostics as well as external measurements of the operational health of the TNS. In this embodiment, all of the feedback-values used are related to the TNS under evaluation, as opposed to being generated from historical or real-time data from another TNS. The monitored parameters include: (a) internal switch-performance-diagnostics and dial-delay, (b) capacity-utilization of the TNS, (c) preventative-maintenance-routine performance, and (d) demand-maintenance required based on user complaints as a result of TNS hardware or software defects.

Each parameter contains one or more selected values that in some way characterize an aspect of the equipment's operational health. Each of the specific values chosen to be included in the prediction is given a relative "weighting", depending on its overall influence on the operational health of the equipment. Using each of the chosen monitored-values and multiplying these values by their relative weighting, an overall prediction of the current operational health of the TNS is determined. In this embodiment, the predicted value for the overall operation health, based on the chosen feedback from the TNS, accounts for at least 80% of the true operational health of the TNS.

In a further embodiment, an even more limited amount of parameters are chosen to predict the operational health of the TNS. The parameters in this more limited list are called "preferred-parameters". This list includes: (a) internal-switch-performance-diagnostics and dial-delay, (b) capacity-utilization of the TNS, (c) preventative-maintenance-routine performance, and (d) demand-maintenance required based on user complaints as a result of TNS hardware or software defects. In this embodiment, the predicted value for the overall operational health, based on the chosen feedback from the TNS, accounts for at least 60% of the true operational health of the TNS.

In further embodiments of the invention, the actual weightings of the parameters or preferred-parameters are given, within a certain range.

In another embodiment, the values selected to be monitored for the parameter called "internal-switch-performance-diagnostics and dial-delay" are specified, depending on the actual manufacturer of the TNS used. A further embodiment includes listing the specific weightings of each of these values.

A further aspect of the current invention involves not only determining the current operational health of the TNS, but also projecting the operational health into the future. A further embodiment discloses forecasting the future operational health for a specific amount of time, such as one month.

A first step in practicing an embodiment of the invention involves determining for the TNS a range of acceptable values for the operational health of the TNS. This range is determined by using at least two operational-health-values from a set of operational-health-values containing current and past operational-health-values. In one embodiment, the range of acceptable values for the operational health is determined with the following procedure. A mean value is determined for a set of operation-health-values comprising current and past operational-health-values. Then, the value for three standard deviations above and below the mean is determined. The range for acceptable operational-health-values is bracketed by the three standard deviation value above and below the mean. In another embodiment, the acceptable range is determined based on experience instead of being based on three standard deviations.

A statistical modeling technique called autoregressive modeling may be used to calculate a future operational-health-value. In one embodiment, multiple equations from the autoregressive models are chosen to be evaluated. Current and past values for the operational health can be used as test values to determine which model produces the lowest deviation from the actual measured value for operational health. The model with the lowest deviation, also referred to as the lowest mean square residual value, is chosen. The chosen autoregressive model is then used to project a future value for the operational health. This forecasted value is then compared to the range of acceptable values for operational health. In one embodiment, if the predicted value falls outside of the acceptable range, a user or other interested party is notified. In another embodiment, the notification includes information about which element on the TNS is likely contributing to the predicted deviation. Once a problematic element is determined, corrective action can be taken in order to prevent a catastrophic failure of the TNS from occurring.

These and other advantages of the invention will be apparent to those of ordinary skill in the art by reference to the following detailed description and the accompanying drawings.

DETAILED DESCRIPTION

In accordance with an aspect of this invention, the inventive tool determines a current operational health of a Telephone Network Switch (TNS) by selectively using only certain parameters. These selected parameters, both internal and external to the TNS, are those that most influence the operational health.

In a further aspect of this invention, the inventive tool projects the operational health of the TNS into the future in order to forecast the TNS performance. In the two discussed aspects of the current invention, not only can a current or future deviation be determined, but also a source of the deviation is identified allowing for a focused preventative maintenance effort.

Figure 1:
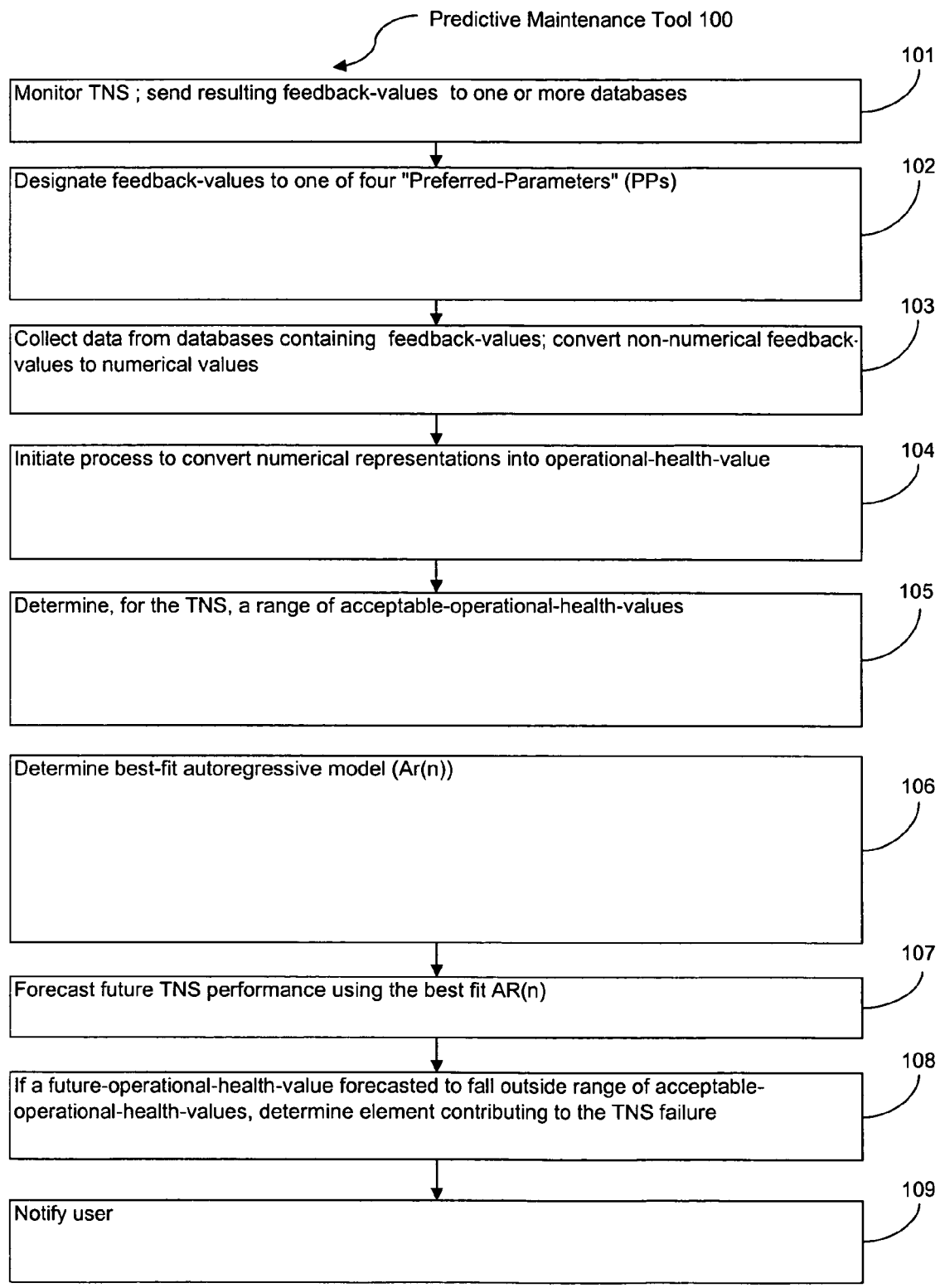
FIG. 1 is a flowchart showing a Predictive Maintenance Tool (PMT) for a Telephone Network Switch (TNS).

FIG. 1 is a flowchart, in 100, showing a Predictive Maintenance Tool for a Telephone Network Switch (TNS). At 101, the TNS is monitored by various systems with the resulting feedback-values for each window of time of TNS operation sent to one or more databases. The feedback-values can be numerical or non-numerical, such as "yes", "no", or the sounding of an alarm. A feedback-value represents some aspect of the operational health of the TNS. Upon receipt at the one or more databases, each feedback-value is designated, as shown at 102, as belonging to one of four "Preferred-Parameters" (PPs): (1) PP1: Internal Switch-Performance-Diagnostics & Dial-delay, (2) PP2: Capacity-Utilization of the TNS, (3) PP3: Preventative-Maintenance-Routines Performance, and (4) PP4: demand-maintenance required based on user complaints as a result of TNS hardware or software defects.

PP1 is a representation of machine generated diagnostics. For PP1, the "internal switch diagnostics" represent self-reporting diagnostics that a TNS vendor equips their switch with in order to indicate the presence or absence of any fault activity in the TNS. Some diagnostics reflect alarms that exhibit a greater influence, i.e. bear more "weight", on the operation of the TNS. In determining the assignment of weights of the various feedback-values in PP1, factors that are considered are manufacturer and industry standards and personal experience. In one embodiment, PP1 for the Lucent line of switches is comprised of twelve sub-categories, all focused on internal switch diagnostics. The PP1 for the Nortel line is composed of nine sub-categories. Seven are focused on internal switch diagnostics, while two are focused on dial-delay. "Dial-delay" includes information concerning dial tone delay and incoming start dial-delay.

PP2 is a representation of capacity management of the TNS, and can also be called "final trunk group utilization". It is the percentage of the number of trunk groups operating at greater than 90% capacity as compared to the total number of in-service final trunk groups in the switch. Customer-facing trunk groups are excluded.

PP3 reflects the influence technical personnel have on the operations of the switch. Various Preventative Maintenance routines are scheduled for completion on a weekly, monthly, quarterly, etc. basis. This PP is a representation of technical attention to preventative maintenance routines, i.e. the percentage of Preventative Maintenance routines that, over the last 30 calendar days, have been completed on time.

PP4 is a representation of a count of customer and/or monitoring center generated trouble tickets. The value describes percentage of trouble tickets to in-service lines and trunks.

At 103, all of the non-numerical feedback-values are converted into a numerical value indicative of the feedback-value. For example, a "yes" or an activation of an alarm may be converted into a "one", and a "no" or no activation of an alarm may be converted into a "zero".

Figure 2:
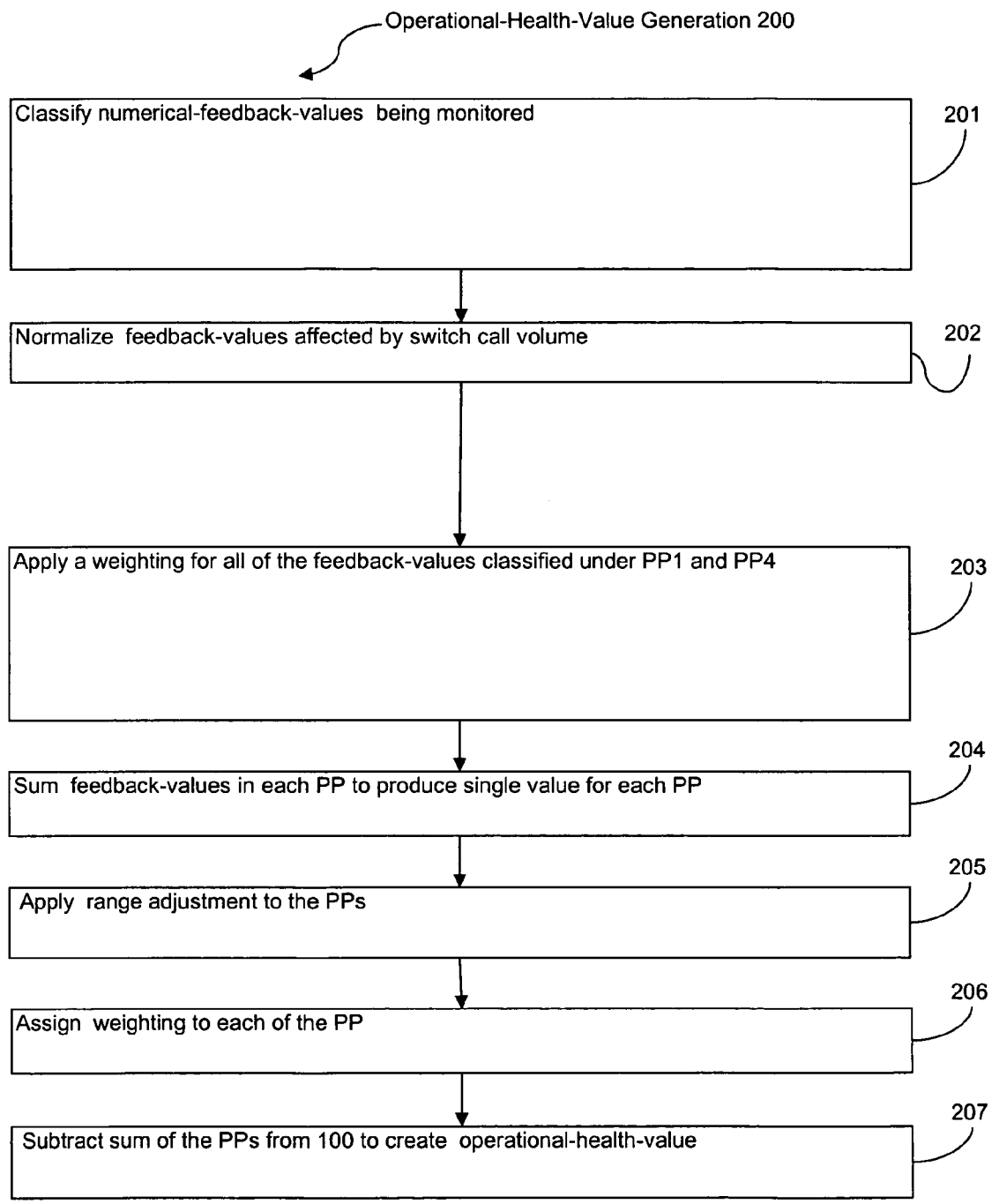
FIG. 2 is a flowchart showing the conversion of multiple values, each partially indicative of an operational health of the TNS, into a single value representing an overall operational health of the TNS.

At 104, a process, as described further in this section under FIG. 2, is initiated which converts all of the individual numerical representations of each feedback-value into an operational-health-value. The operational-health-value represents the operational health of the TNS for a window of time of TNS operation from which the TNS feed-back values were collected. This single value is used for several calculations and determinations. As previously noted, this calculation is based on selecting the feedback-values that most strongly indicate the operational health of the TNS. This selection simplifies the monitoring of the TNS and the calculation of the operational-health-value. However, since a good number of feedback-values are intentionally not included, i.e. those deemed to be less indicative of the operational health of the TNS, there is a certain amount of uncertainty associated with the operational-health-value. In different embodiments of the invention, depending on how many feedback-values are included in the calculation of the operational-health-value, a determination is made concerning how closely the true operational health of the TNS is approximated by the operational-health-value. In one embodiment, at least 80% of the true operational health is determined. In another embodiment, at least 60% of the true operational health is determined.

Some examples of uses for the operational-health-value are discussed later in FIG. 1, and they include: (1) a determination of the operational health of a TNS, (2) a component is determining a range of acceptable operational-health-values for a TNS, and (3) as a component in a data series of operational-health-values used to project a forecast of a future operational-health-value.

At 105, a determination of a range of acceptable-operational-health-values is made for the TNS. First, a mean value is determined by averaging operational-health-values comprising of current and past operational-health-values. While a mean value can be determined with as little as two values, in one embodiment, more than two values are used to determine the mean value. In one embodiment, after a mean value is determined, three standard deviations from this mean value is determined. Acceptable-operational-health-values comprise values falling in the range within three standard deviations above and below the mean value. In another embodiment, the range is chosen based on user experience.

At 106, the method continues, in one embodiment, by projecting the operational-health of the TNS into the future. This forecast, in one embodiment, is performed with an autoregressive (AR(n)) model. In one embodiment, a group of (AR(n)) models are used and the one which best fits a time series of operational-health-values is used to make the forecast. In one embodiment, the time series of operational-health-values is a series of operational-health-values that a spaced one day apart. Several statistical software programs can be found in the marketplace that use autoregressive modeling, also known as Box-Jenkins modeling, to analyze time series data. AR(n) models are a convenient tool for better understanding a time series of data. In the current embodiment, an AR(n) model is used to forecast future values in a time series of operational-health-values in order to forecast future operational-health-values.

However, before computing which AR(n) model best fits the time series, it needs to be determined if the time series of operational-health-values exhibits stationarity. Stationarity is a stochastic process whose probability distribution is the same for all times. As a result, the mean value as well as standard deviations from the mean are constant over time. When a time series of data point exhibits stationarity, a correlation between various values "k" days apart depends only on "k", and not any other trends in the data, such as seasonal or periodical trends. The calculation of stationarity is described in the following steps.

First, a set of operational-health-values are determined over a given period of time, and listed in a column. Second, a second column is formed, which is a replicated of the first column, where the first entry is blank, and all of the values in the second column are the same as the values in the first column, except that they are lagged one time period behind the first column. Third, calculate the mean of the observed operational-health-values, called "Ī".

$$\bar{I} = \frac{\sum_{t=1}^{t=m} I_t}{m}$$

"$I_t$" is the operative-health-value for a given time. "m" is the number of operational-health-values values in the time series, (the number may be slightly less than the actual total number of operational-health-values in the time series due to removal of outliers).

Fourth, compute "r", where:

$$r = \frac{\sum_{t=1}^{t=m-1}(I_t - \bar{I})(I_{t+1} - \bar{I})}{\sum_{t=1}^{t=m}(I_t - \bar{I})^2}$$

"r" is the correlation coefficient between the observed series and the observed series lagged once.

$$"\sum_{t=1}^{t=m-1}"$$

is the sum of the terms from period "t=1" to period "t=m−1".

Fifth, compute "z"

$$z = \left(\frac{\sqrt{m-4}}{2}\right)\ln\left[\frac{(1+r)}{(1-r)}\right]$$

"ln" is the natural log.

If the absolute value of "z" is found to be less than or equal to 2, i.e. $|z| \leq 2$, then the series would be declared stationary, and the original set of operation-health-values would be used to decide with AR(n) model to use. However, if absolute value of "z" is found to be greater than 2, i.e. $|z| > 2$, then the series is declared non-stationary. In this case, the "first-difference-values" is used in the determination of which AR(n) model fits the data best. The first-difference-values are computed from the difference between each operational-health-value and the previous operational-health-value. The same column setup established in the second step above can be used for this calculation.

Once a data series is identified, the last part of 106 is choosing the proper AR(n). The AR(n) used to forecast the future performance of a TNS is chosen from one of the five AR(n) models, which are: AR(1), AR(2), AR(3), AR(4), and AR(5). The AR(n) with the least Mean Square Residual (MSR) is the AR(n) used to forecast.

First, a matrix is established for each AR(n) to be modeled. The size of the matrix is a function of various factors: (1) the number of operational-health-values that are in the original data series, (2) whether actual operational-health-values or their first-difference-values are used, and (3) which AR(n) is being tested. The number of columns created, in addition to the column containing the original data series, is equal to "n" of AR(n). Each additional column is a replicate of the previous column, except that all the values in the added column are lagged one time period behind the first column. The first row is therefore left blank, since there are no values to fill it. Therefore, if the original data series comprised of 20 values, the AR(1) model would be a 19×2 matrix, the AR(2) model would be an 18×3 matrix, and so forth.

Second, the X-matrix is formed. This is done by taking the above matrix for the AR(n) model and replacing the values in the first column with "1"s and ignoring the information in the first "n" rows, "n" represents number of the AR(n) being tested.

Third, transpose the X-matrix, resulting in the $X^1$-matrix, where the rows become the columns and the columns become the rows. This is known as either the "X transpose" or the "X prime" matrix.

Fourth, multiply the two matrices, the $X^1$ matrix times the X matrix. This results in a "n+1" by "n+1" matrix, i.e. the number of rows of the first matrix and the number of columns of the second matrix. This is called the $X^1X$ matrix, which is a square matrix, i.e. the number of rows equals the number of columns.

Fifth, take the inverse of the $X^1X$ matrix, which results in the $(X^1X)^{-1}$ matrix, called the "X prime X inverse" matrix.

Sixth, make a vector by using the original data series, called the $\underline{Y}$ vector. It has all of the original data series, except for the first "n" rows. Multiply the $X^1$ matrix by the $\underline{Y}$ vector. This results in the $X^1\underline{Y}$ matrix, an "(n+1)" by "1" matrix.

Seventh, determine the b vector, also known as the regression coefficient vector, as follows:

$$b = (X^1X)*(X^1\underline{Y})$$

The resultant b vector is an "(n+1)" by "1" array. The first value (found in row 1, column 1) is the "coefficient" or "coefficient intercept". The second value (found in row 2, column 1) can be called "X Variable 1". The number of "X Variable n" is dependent on which AR(n) is being modeled.

Eighth, Determine the predicted values, "$\hat{Y}$", based on the "X" matrix, using the following formula:

$$\hat{Y} = X*b$$

Ninth, determine the Vector of Residuals, "R", as follows:

$$R = \underline{Y} - \hat{Y}$$

Tenth, take the transpose of "R", giving "$R^1$", called "R prime" or "R transpose".

Eleventh, multiply "$R^1*R$" giving the Sum of Squares for Residuals (SS), which results in a scalar matrix, a "1×1" matrix.

Twelfth, determine the Mean Square Residual, as follows:

$$MSR = SS/(\text{Size of the } \underline{Y} \text{ vector} - b \text{ vector})$$

The MSR for each of the five of the AR(n) models is compared. The model with the least MSR value is selected as the AR(n) model of choice.

Once an autoregressive model that minimizes the MSR has been determined, in one embodiment, at 107, the model is used to forecast a future-operational-health-value of the TNS. First, the outliers that were ignored in determining the best fitting AR(n) model are now un-ignored. Second, as mentioned above in the seventh step of determining the AR(n) model of choice, the "b" vector, which is also known as the regression coefficient vector, is determined. The first value in the "b" vector, called here "$A_0$", is the "coefficient intercept". The next value, or values, in the "b" vector, called here "$A_1$, $A_2$, . . . , $A_n$, is the "X Variable n" value. As example of predicting an operational-health-value for the TNS, if the autoregressive model selected is AR(3), then a future-operational-health-value, $OPHi_P$ at time "P", would be forecasted as follows:

For predicted day 1 (Day 51)

$$OPHi_{51} = A_0 + A_1 OPHi_{50} + A_2 OPHi_{49} + A_3 OPHi_{48}$$

where $OPHi_{50}$ is the current-operational-health-value,
$OPHi_{48}$ and $OPHi_{49}$ are past-operational-health-values
$A_0$ is the "coefficient intercept",
and $A_1$, $A_2$, $A_3$ are the "X Variable 1", "X Variable 2", and "X Variable 3" values for AR(3)

For predicted day 2 (Day 52)

$$OPHi_{52}=A_0+A_1OPHi_{51}+A_2OPHi_{50}+A_3OPHi_{49}$$

where $OPHi_{51}$ is first future-operational-health-value

For predicted day 3 (Day 53)

$$OPHi_{53}=A_0+A_1OPHi_{52}+A_2OPHi_{51}+A_3OPHi_{50}$$

For predicted day 4 (Day 54)

$$OPHi_{54}=A_0+A_1OPHi_{53}+A_2OPHi_{52}+A_3OPHi_{51}$$

For predicted day 5 (Day 55)

$$OPHi_{55}=A_0+A_1OPHi_{54}+A_2OPHi_{53}+A_3OPHi_{52}$$

At 108, when a deviation is forecasted, the method calls for determining which element is projected to contribute to the TNS failure. This element can be pinpointed by analyzing the feedback-values that are being monitored.

When a future deviation is predicted and a contributing element is identified, the method continues, at 109. A user is notified of an element which is forecasted to contribute to the future-operational-health-value falling out of the range of acceptable-operational-health-values. This enables corrective action to be taken before TNS failure occurs.

FIG. 2, in 200, describes the generation of an operational-health-value for a TNS. This is done by putting the multiple feedback-values for the TNS through a series of calculations in order to convert the feedback-values into a single operational-health-value. The method described in this figure is detailing step 104 on FIG. 1. Step 104 comes after step 103, which converted all non-numerical feedback-values into numerical values indicative of the feedback-values. Therefore, all references to "feedback-values" when describing FIG. 2 assume non-numerical feedback-values have already been converted into numerical values representing the feedback-value.

At 201, the various preferred-parameters used in this embodiment are listed. They are as follows: (a) PP1: internal switch-performance-diagnostics & dial-delay, (b) PP2: capacity-utilization of the TNS, (c) PP3: preventative-maintenance-routine performance, and (d) PP4: demand-maintenance required based on user complaints relating to TNS hardware or software defects.

At 202, the calculation of the operational-health-value begins with "step 1". At step 1, those feedback-values that are affected by switch call volume are "normalized". This is done by dividing the feedback value by daily call volume. Therefore, after normalization, the values are more independent of fluctuations in daily call volume than before normalization. This step only applies to the feedback-values categorized in PP1 as "internal switch-performance-diagnostics" and all values in PP4. However, this does not apply to the feedback-values in PP1 for "dial-delay" and all values in PP2 and PP3, since they do not vary with switch call volume.

Step 2, at 203, describes applying a weight to each of the feedback-values classified under PP1 and PP4. These weightings represent the relative influence that each feedback-value has on the PP, and therefore on the overall operational health of the TNS. The weightings are assigned based on experience and industry specifications. The application of weightings only applies to PP1 and PP4 since PP2 and PP3 each only have one numerical-feedback-value. The application of a weight to the general PP categories relative to each other is done later in step 5, at 206.

PP1: Lucent 5ESS diagnostics:
  a. AMA IRR:
    Sub-category weight=9%
  b. ONTC FAULTS:
    Sub-category weight=15%
  c. PDTO:
    Sub-category weight=5%
  d. AMA LOST:
    Sub-category weight=9%
  e. INITIALIZATIONS:
    Sub-category weight=14%
  f. MDII MESSAGES:
    Sub-category weight=9%
  g. DFC (DEFENSIVE CHECK FAILURES) and ASSERTS:
    Sub-category weight=9%
  h. SPP MESSAGES (Single Process Purge):
    Sub-category weight=4%
  i. AUDITS:
    Sub-category weight=4%
  j. RTA DCF ERROR:
    Sub-category weight=4%
  k. MANUAL ACTIONS:
    Sub-category weight=9%
  l. INTERUPTS:
    Sub-category weight=9%

PP1: Nortel DMS-500:
  a. SPMS (Switch Performance Monitoring System):
    Sub-category weight=23%
  b. AUDIT:
    Sub-category weight=9%
  c. ENET (Network Integrity Failure):
    Sub-category weight=10%
  d. LOST CALLS:
    Sub-category weight=10%
  e. SWACT:
    Sub-category weight=10%
  f. SWERR:
    Sub-category weight=14%
  g. TRAP:
    Sub-category weight=14%
  h. DTD:
    Sub-category weight=6%
  i. IDDD:
    Sub-category weight=4%

PP2 & PP3: No sub categories

PP4:
  a. Trouble ticket source number one:
    Sub-category weight=50%
  b. Trouble ticket source number two:
    Sub-category weight=50%

In step 3, at 204 the numerical-feedback-values in each PP are summed to produce a single value for each PP.

In step 4, at 205, a range adjustment is applied to the PP. This adjustment places an equivalent unit value across all the preferred-parameters. Now, the individual values from each PP can be compared to each other.

Step 5, at 206, applies a weight to each PP, in a similar manner as was done at Step 2. This enables the relative contribution of each PP toward determining the overall operational health of the TNS to be properly taken into consideration. In one embodiment, the weighting is as follows:

| | |
|---|---|
| PP1: | 50% |
| PP2: | 15% |
| PP3: | 10% |
| PP4: | 25% |

Only a select amount of the available parameters and feedback-values from the operation of the TNS have been chosen in these embodiments of the invention. By choosing to leave out parameters and feedback-values, the determination of the operational-health has been greatly simplified. Parameters left out are those that are deemed to have less than a 10% overall influence on an operational-health-value. Feedback-values left out are those that are deemed to have less than a 2% overall influence on an operational-health-value.

In step 6, at 207, the sum of the preferred-parameters is subtracted from 100 to generate the operational-health-value.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of quantifying a determination of an operational health of a Telephone Network Switch (TNS), the method being performed by a processor executing computer program instructions, the method comprising:
   1) the processor receiving feedback-values, both numerical and non-numerical, relating to the operational health of the TNS from a specific window of time of operation of the TNS, said feedback-values being associated with parameters selected from the group consisting of:
      (a) internal switch-performance-diagnostics and dial-delay, (b) capacity-utilization of the TNS, (c) preventative-maintenance-routine performance, and (d) demand-maintenance required based on user complaints relating to TNS hardware or software defects;
   2) the processor converting all non-numerical feedback-values into a numerical value indicative of the feedback-value;
   3) the processor assigning a weight to the numerical value for each feedback-value to reflect a relative importance of the feedback-value in determining the operational health of the TNS; and,
   4) the processor calculating an operational-health-value, based on the numerical value for each feedback-value and the assigned weight for each feedback-value, wherein the operational-health-value accounts for at least 80% of an accurate prediction of the operational health of the TNS;
   5) wherein the total assigned weight to the feedback-values in each preferred-parameter are in the following ranges:
      (a) 40-60% for the internal switch-performance-diagnostics and dial-delay,
      (b) 5-25% for the capacity-utilization of the TNS,
      (c) up to 20% for the preventative-maintenance-routine performance, and
      (d) 15-35% for the demand-maintenance required based on user complaints relating to TNS hardware or software defects
   6) and wherein the sum of the total assigned weights does not exceed 100%.

2. A method of quantifying a determination of an operational health of a Telephone Network Switch (TNS), the method being performed by a processor executing computer program instructions, the method comprising:
   1) the processor receiving feedback-values, both numerical and non-numerical, relating to the operational health of the TNS from a specific window of time of operation of the TNS, said feedback-values being associated with parameters selected from the group consisting of:
      (a) internal switch-performance-diagnostics and dial-delay, (b) capacity-utilization of the TNS, (c) preventative-maintenance-routine performance, and (d) demand-maintenance required based on user complaints relating to TNS hardware or software defects;
   2) the processor converting all non-numerical feedback-values into a numerical value indicative of the feedback-value;
   3) the processor assigning a weight to the numerical value for each feedback-value to reflect a relative importance of the feedback-value in determining the operational health of the TNS; and,
   4) the processor calculating an operational-health-value, based on the numerical value for each feedback-value and the assigned weight for each feedback-value, wherein the operational-health-value accounts for at least 80% of an accurate prediction of the operational health of the TNS;
   5) wherein when said specific window of time of the operation of the TNS is a window of time in which the most current feedback-values from the operation of the TNS are used to determine the operational-health-value, said operational-health-value is called a current-operational-health-value;
   6) wherein when said specific window of time of the operation of the TNS is a window of time in which values from before the most current feedback-values from the operation of the TNS are used to determine the operational-health-value, said operational-health-value is called a past-operational-health-value;
   7) wherein when said specific window of time of the operation of the TNS is a window of time that has not yet occurred, a projected operational-health-value is called a future-operational-health-value,
   8) and wherein a future operational health of a TNS is forecasted by,
      a) the processor determining, for the TNS, a range of acceptable-operational-health-values, wherein said determining of the range of acceptable-operational-health-values is calculated based on using at least two operational-health-values from a set of operational-health-values containing current and past operational-health-values;
      b) the processor forecasting, for the TNS, the future-operational-health-value, wherein said forecasting of the future-operational-health-value is calculated based on the current-operational-health-value and at least one past-operational-health-value; and,
      c) the processor comparing the future operational-health-value with the range of acceptable-operational-health-values.

3. The method of claim 2, further comprising
the processor determining, in a situation where the future-operational-health-value falls outside the range of acceptable-operational-health-values, an element of the TNS that is contributing to the future-operational-health-value falling outside of the range of acceptable-operational-health-values.

4. The method of claim 3, further comprising the processor informing a user as to the identification of the element of the TNS that is contributing to the future-operational-health-value falling outside of the range of acceptable-operational-health-values.

5. The method of claim 2, wherein, when calculating of the range of acceptable-operation-health-values:

a mean value is determined, based on the current and past operational-health-values; and, the range of acceptable-operational-health-values is three standard deviations higher and lower than the mean value.

6. A non-transitory computer readable medium storing computer program instructions which, when executed on a processor, perform the steps of:

1) receiving feedback-values, both numerical and non-numerical, relating to the operational health of the TNS from a specific window of time of operation of the TNS, said feedback-values being associated with parameters selected from the group consisting of
   (a) internal switch-performance-diagnostics and dial-delay, (b) capacity-utilization of the TNS, (c) preventative-maintenance-routine performance, and (d) demand-maintenance required based on user complaints relating to TNS hardware or software defects;
2) converting all non-numerical feedback-values into a numerical value indicative of the feedback-value;
3) assigning a weight to the numerical value for each feedback-value to reflect a relative importance of the feedback-value in determining the operational health of the TNS; and,
4) calculating an operational-health-value, based on the numerical value for each feedback-value and the assigned weight for each feedback-value, wherein the operational-health-value accounts for at least 60% of an accurate prediction of the operational health of the TNS,
5) wherein when said specific window of time of the operation of the TNS is a window of time in which the most current feedback-values from the operation of the TNS are used to determine the operational-health-value, said operational-health-value is called a current-operational-health-value;
6) wherein when said specific window of time of the operation of the TNS is a window of time in which values from before the most current feedback-values from the operation of the TNS are used to determine the operational-health-value, said operational-health-value is called a past-operational-health-value;
7) wherein when said specific window of time of the operation of the TNS is a window of time that has not yet occurred, a projected operational-health-value is called a future-operational-health-value,
8) and wherein a future operational health of a TNS is forecasted by
   a) determining, for the TNS, a range of acceptable-operational-health-values, wherein said determining of the range of acceptable-operational-health-values is calculated based on using at least two operational-health-values from a set of operational-health-values containing current and past operational-health-values;
   b) forecasting, for the TNS, the future-operational-health-value, wherein said forecasting of the future-operational-health-value is calculated based on the current-operational-health-value and at least one past-operational-health-value; and
   c) comparing the future operational-health-value with the range of acceptable-operational-health-values.

7. The non-transitory computer readable medium of claim 6 wherein the program instructions, when executed on the processor, perform the further step of determining, in a situation where the future-operational-health-value falls outside the range of acceptable-operational-health-values, an element of the TNS that is contributing to the future-operational-health-value falling outside of the range of acceptable-operational-health-values.

8. The non-transitory computer readable medium of claim 7 wherein the program instructions, when executed on the processor, perform the further step of informing a user as to the identification of the element of the TNS that is contributing to the future-operational-health-value falling outside of the range of acceptable-operational-health-values.

* * * * *